US006606917B2

(12) United States Patent
Sund et al.

(10) Patent No.: US 6,606,917 B2
(45) Date of Patent: Aug. 19, 2003

(54) HIGH PURITY CORIOLIS MASS FLOW CONTROLLER

(75) Inventors: Wesley E. Sund, Eden Prairie, MN (US); Daniel P. McNulty, Westminster, CO (US); Timothy W. Scott, Lansdale, PA (US); Matthew G. Wheeler, Arvada, CO (US); Jeffrey L. Whiteley, Quakertown, PA (US); Joseph C. Dille, Telford, PA (US); Michael J. Barger, Sauderton, PA (US); Gary E. Pawlas, Louisville, CO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/995,174

(22) Filed: Nov. 26, 2001

(65) Prior Publication Data

US 2003/0097884 A1 May 29, 2003

(51) Int. Cl.$^7$ ................................................ G01F 1/84
(52) U.S. Cl. ................................................ 73/861.355
(58) Field of Search .................... 73/861.18, 861.19, 73/861.354, 861.355, 861.357

(56) References Cited

U.S. PATENT DOCUMENTS

| 3,612,090 A | | 10/1971 | Kassel .................... 137/209 |
| 3,924,471 A | * | 12/1975 | Singer .................... 73/864.35 |
| 5,157,975 A | | 10/1992 | Tanaka et al. |
| 5,448,921 A | * | 9/1995 | Cage et al. ............. 73/861.355 |
| 5,549,009 A | | 8/1996 | Zaschel ................. 73/861.355 |
| 5,555,190 A | | 9/1996 | Derby et al. |
| 5,672,832 A | | 9/1997 | Cucci et al. |
| 5,693,887 A | | 12/1997 | Englund et al. |
| 5,806,716 A | | 9/1998 | Vogt ............................. 222/59 |
| 5,852,244 A | | 12/1998 | Englund et al. |
| 5,857,893 A | | 1/1999 | Olsen et al. |
| 5,869,766 A | | 2/1999 | Cucci et al. |
| 5,975,126 A | | 11/1999 | Bump et al. ............. 137/487.5 |
| 6,073,495 A | * | 6/2000 | Stadler ........................ 73/32 A |
| 6,126,517 A | | 10/2000 | Tolles et al. |
| 6,293,849 B1 | | 9/2001 | Kawashima |
| 6,311,136 B1 | * | 10/2001 | Henry et al. ............ 73/861.355 |
| 6,370,972 B1 | * | 4/2002 | Bomber et al. .......... 73/863.23 |
| 6,450,042 B1 | | 9/2002 | Lanham et al. |

FOREIGN PATENT DOCUMENTS

| EP | 0473919 A | 3/1992 |
| EP | 0772027 A | 5/1992 |
| WO | WO0136918 A | 5/2001 |

OTHER PUBLICATIONS

International Search Report for International Application No. PCT/US02/37791 (Apr. 3, 2003).

* cited by examiner

*Primary Examiner*—Hezron Williams
*Assistant Examiner*—Takisha S Miller
(74) *Attorney, Agent, or Firm*—Howrey Simon Arnold & White LLP

(57) ABSTRACT

A mass flow measurement and control device includes an enclosure with a Coriolis mass flowmeter situated therein. The Coriolis mass flowmeter has a flow-tube made of a high-purity plastic material, a driver coupled to the flow tube for vibrating the flow tube, and a pickoff coupled to the flow tube for sensing Coriolis deflections of the vibrating flow tube. A pinch valve includes an elastomeric tube made of a high-purity plastic material in fluid communication with the flow tube. An actuator with a ram operatively connected thereto is situated adjacent the elastomeric tube, and a reference surface is positioned generally opposite the ram such that the elastomeric tube is squeezable between the ram and the reference surface. A controller may also be provided, which receives an output signal from the Coriolis flowmeter and provides a control output signal to the pinch valve actuator in response to the flowmeter output signal and a setpoint signal.

29 Claims, 7 Drawing Sheets

HIGH PURITY CORIOLIS MASS FLOW CONTROLLER

CROSS-REFERENCE TO RELATED APPLICATIONS

This application is related to U.S. Patent Applications entitled "High Purity Fluid Delivery System," "Flowmeter for the Precision Measurement of an Ultra-Pure Material Flow," "Methods of Manufacturing a PFA Coriolis Flowmeter," "Manufacturing Mass Flow Meters Having a Flow Tube Made of a Fluoropolymer Substance" and "Compensation Method for a PFA Coriolis Flowmeter," each filed on the same day as this application. The entire disclosures of the referenced applications are incorporated by reference herein.

BACKGROUND OF THE INVENTION

1. Field of the Invention

The present invention relates generally to fluid flow measurement and control, and more particularly, to Coriolis mass flow controllers that are suitable for use in ultra-pure or corrosive applications, or other applications not compatible with standard metal Coriolis flowmeters.

2. Description of Related Art

Many industries such as semiconductor, pharmaceutical, and bio-technology experience fluid delivery problems due to the typically low flow rates, the use of abrasive chemical fluids, the use of corrosive chemical fluids, and the need for contaminant free, accurate, compact, and real-time fluid delivery and/or blending systems.

A fluid delivery system generally consists of three components: fluid propulsion, flow measurement and control, and a user interface. Many present systems use a positive displacement pump, such as a peristaltic pump, to perform all three tasks. The pump propels the fluid from the storage container to the process or reactor. The pump also moves the fluid at a more or less constant rate depending on the speed of the pump, though the peristaltic pumping action causes a pulsation in the fluid delivery rate. The user interface consists of adjusting the pump's speed or simply turning the pump on and off. This method does not provide very precise flow control and the pumping action and the internal geometry of the pump can contaminate or harm the fluid.

The peristaltic pump provides no closed loop feedback on the flow measurement. In addition, since it is a volumetric delivery system, the amount of fluid varies with changing process conditions such as pressure, temperature, etc. The pump tubing also wears over time, changing the volume of fluid delivered with no change in pump speed. When the process requires precise fluid delivery it is also common to verify the delivery rate by manually measuring the amount of the fluid on a scale or graduated container over a period of time. A typical batch blending system is shown in FIG. 1. Multiple fluids, A through N, flow into a container 11 placed on a scale 12. One fluid is allowed to run through a flow valve 13 at a time. The scale total is examined and when the desired amount of Fluid A has been added, the valve 13 is closed. The same process is repeated with the remaining fluids. Eventually, a total mixture is obtained. If too much or too little of any fluid has been added the process must continue until the proper mass of each fluid, within some acceptable error band, has been added.

Another known approach uses a level sensor to measure the volume of each fluid of the blend as it is being added to the vessel. This requires a very precise knowledge of the volume of the vessel with small increments of vessel height.

Chemical-Mechanical Planarization (CMP) is a critical process in the semiconductor industry that involves a process to flatten the wafer surface of a semiconductor by applying an ultra-pure fluid containing suspended solid particles and a reactive agent between the wafer surface and a polishing pad. In most applications, the polishing pad rotates at a controlled speed against the semiconductor to flatten the surface. Over-polishing the wafer can result in altering or removing critical wafer structures. Conversely, under-polishing of the wafer can result in unacceptable wafers. The polishing rate of the wafer is highly dependent upon the delivery rate of the fluid and the total amount of fluid delivered during a polishing operation.

Another process used in the semiconductor industry requiring accurate control of fluid flows and a contaminant free environment is the photolithography process. As is known in the art, photolithography is a process that applies a light sensitive polymer, known as resist, or photo resist, to the wafer surface. A photomask containing a pattern of the structures to be fabricated on the wafer surface is placed between the resist covered wafer and a light source. The light reacts with the resist by either weakening or strengthening the resist polymer. After the resist is exposed to light the wafer is developed with the application of fluid chemicals that remove the weakened resist. Accurate and repeatable resist delivery is essential to properly transfer the pattern. The resist must be contamination free as any "dirt" on the surface will cause a defect in the final pattern.

A modification of this process applies a host of new liquids to the wafer surface to create films that will become an integral part of the final semiconductor. The primary function of these films is to act as an insulator between electrical conducting wires. A variety of "spin-on" materials are being evaluated with a wide variety of chemical compositions and physical properties. The key difference between the lithography process and the spin-on deposition is that any defect in the film (such as a void, bubble or particle) is now permanently embedded in the structure of the semiconductor and could result in non-functioning devices and a financial loss for the semiconductor producer.

Both of these processes take place in a tool called a "track." The purpose of the track is to apply a precise volume of fluid to the surface of a stationary or slowly spinning wafer. Additional chemical processing steps may be used to convert the liquid to the proper structure. After the liquid application, the wafer rotation speed is rapidly increased and the liquid on the wafer surface is spun off the edge. A very thin, consistent thickness of liquid remains from the center of the wafer to the edge. Some of the variables that affect liquid thickness include the resist or dielectric viscosity, solvent concentration in the resist or dielectric, the amount of resist/dielectric dispensed, speed of dispense, etc.

The track will also provide additional processing steps after liquid application that changes the liquid to a polymer using a bake process that also removes any solvent in the film. The track also controls the environment around the wafer to prevent changes in humidity or temperature and chemical contaminants from affecting the performance of the film. Track system performance is determined by the accuracy and repeatability of liquid delivered to the wafer surface in addition to minimizing defects in the film caused by voids, bubbles and particles.

Therefore, there is a need for an efficient, compact and contaminant free solution to fluid delivery systems to address shortcomings associated with the prior art.

SUMMARY OF THE INVENTION

In one aspect of the present invention, a mass flow measurement and control device includes an enclosure with a Coriolis mass flowmeter situated therein. The Coriolis mass flowmeter has a flow-tube made of a high-purity plastic material, a driver coupled to the flow tube for vibrating the flow tube, and a pickoff coupled to the flow tube for sensing Coriolis deflections of the vibrating flow tube. A pinch valve includes an elastomeric tube made of a high-purity plastic material in fluid communication with the flow tube. An actuator with a rain operatively connected thereto is situated adjacent the elastomeric tube, and a reference surface is positioned generally opposite the ram such that the elastomeric tube is squeezable between the ram and the reference surface.

The flow tube and pinch valve elastomeric tube may both be fashioned from PFA. Further, these tubes may comprise a single tube. In other embodiments, the pinch valve tube is fashioned from a more flexible material, such as silicone. In some exemplary embodiments, a controller that receives a setpoint signal and an output signal from the Coriolis flowmeter and provides a control output signal to the pinch valve actuator in response thereto. The controller may be situated in the enclosure, or external thereto. Similarly, the pinch valve may be positioned within the enclosure, or attached to an external surface thereof

BRIEF DESCRIPTION OF THE DRAWINGS

Other objects and advantages of the invention will become apparent upon reading the following detailed description and upon reference to the drawings in which.

Figure 2:
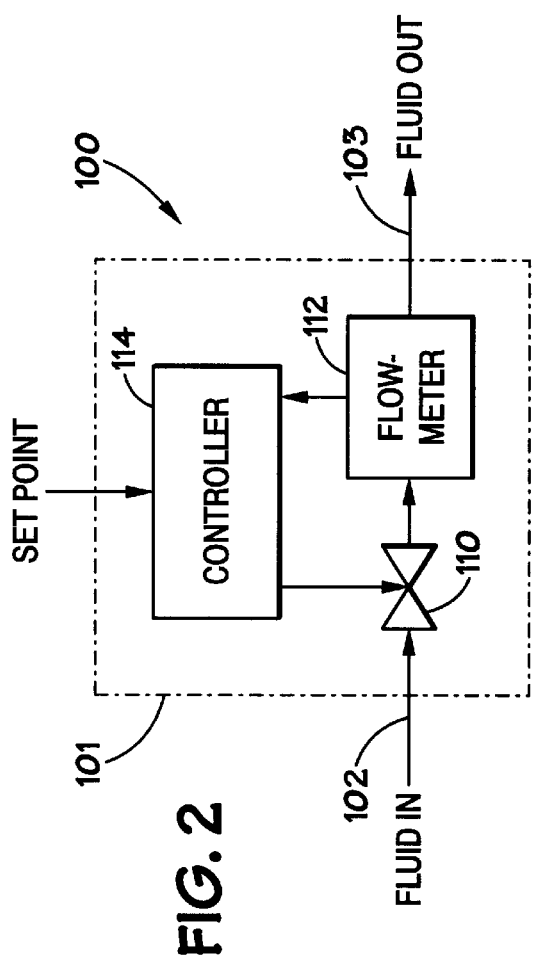
FIG. 2 is a block diagram illustrating a mass flow measurement and control device in accordance with an exemplary embodiment of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 2 schematically illustrates a high purity mass flow measurement and control device 100 for controlling a process material in accordance with exemplary embodiments of the invention. The control device 100 includes an enclosure 101 having a fluid inlet and outlet 102, 103. A Coriolis mass flowmeter 112 is situated in the enclosure 101. The Coriolis mass flowmeter 112 has a flow-tube made of a high-purity plastic material to prevent contamination of the process fluid caused by transferring unwanted (e.g. metal) ions to the process material. A pinch valve 110, also having components made of a high purity plastic material to prevent transferring ions to the process material is in fluid communication with the flowmeter 112. In the block diagram of FIG. 2, the valve 110 is shown as being situated completely within the enclosure 101. In some embodiments, portions of the valve, or the entire valve, are attached to an outside surface of the enclosure 101.

A controller 114 receives a setpoint signal and an output signal from the flowmeter 112. The controller 114 conditions and processes the signal from the flow meter and outputs a control signal to the valve 110 to vary the flow rate of the process material based on a comparison of the setpoint and measured flow rate. The setpoint input to the controller 114 is typically an electronic signal such as a 0–5V, 4–20 mA signal or a digital signal. A pneumatic setpoint interface could also be used. A suitable setpoint generator is a model P48 process controller available from Red Lion Controls of York, Pa.

The controller 114 may also have a feature commonly known as valve override, where an additional signal is sent to the controller 114. This override signal causes the controller 114 to ignore the setpoint and fully open or close the valve 110. This feature is often used for shutting the flow off or purging the system. In FIG. 2, the controller 114 is shown as being positioned inside the enclosure 101, providing a completely integrated flow control system. In other embodiments, however, the controller 114 is external to the enclosure 101.

Figure 3:
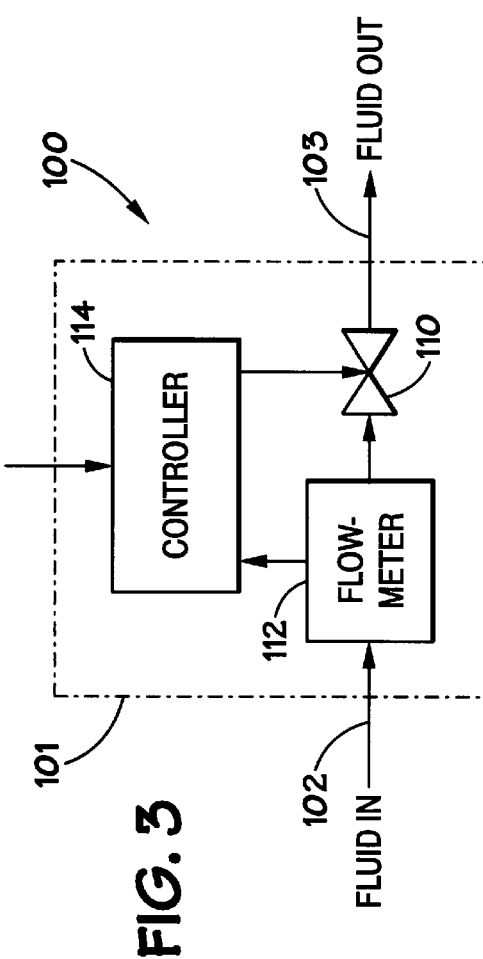
FIG. 3 is a block diagram illustrating a mass flow measurement and control device in accordance with another exemplary embodiment of the invention.
Figure 1:
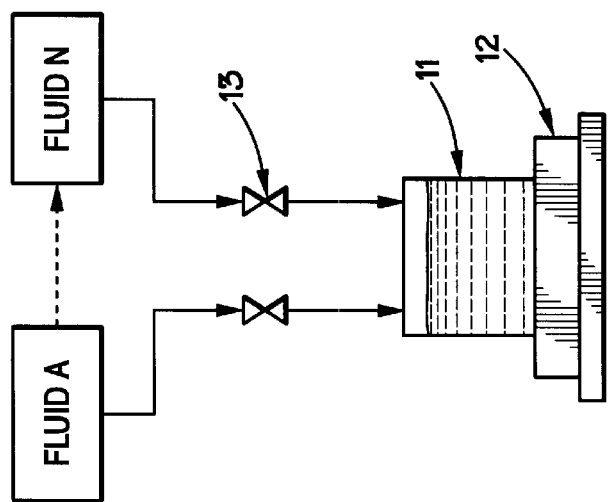
FIG. 1 schematically illustrates a prior art off-line blending system.

The valve 110 regulates the flow through the device 100, and it also provides a buffer against changes in line pressure. The valve 110 can be positioned either upstream of the mass flowmeter 112 as shown in FIG. 2, or downstream as in the embodiment shown in FIG. 3. Generally, it is preferable to have the valve 110 on the side that will see the largest pressure variations during use. This helps shelter the flow meter 112 from pressure changes and fluctuations.

Figure 4:
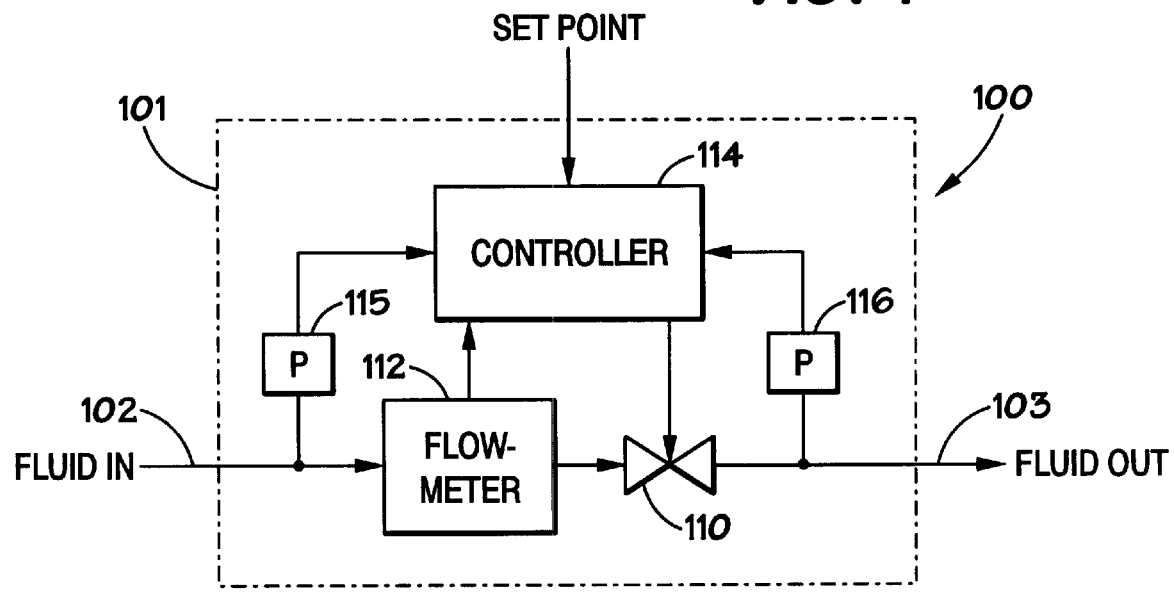
FIG. 4 is a block diagram illustrating a mass flow measurement and control device in accordance with a further exemplary embodiment of the invention.

The operating characteristics of fluid control elements and mass flow meters can have some dependence on operating pressure. It may thus be desirable to provide a pressure transducer in the mass flow controller for compensation purposes as shown in FIG. 4. Pressure transducers 115, 116 are situated at the device inlet and outlet 102, 103. Alternatively, the inlet transducer 115 or the outlet transducer 116 may be provided, rather than both, depending on the desired compensation. The pressure transducers 115,116 could also be made integral to the flow meter 112, or be inherent to the flow meter's operation.

Many applications, such as those associated with the semiconductor, pharmaceutical, and biotechnology industries, require the flow path (all surfaces wetted by the process fluid) of fluid delivery systems be constructed of high purity, chemically inert/resistant, materials to protect the purity of the chemicals used. Plastics are desirable because the ultra pure chemicals used in the semiconductor wafer fabrication processes can be contaminated if metal ions are leached or removed from metal flow tubes due to a variety of mechanical and chemical processes. Plastic materials are corrosion resistant to a wide range of process materials. High purity grade plastics are thus used in these industries since this generally prevents transferring unwanted ions to the process material. In addition, the smooth surface finish inherent in the manufacturing of a plastic flow tube reduces the ability of bacteria to attach to the tube and contaminate the fluid with organic materials.

The wetted path of the flowmeter 112 is designed such that it has no cracks, crevices, etc. that could harbor bacteria. A suitable high purity plastic is PFA (perfluoroalkoxy copolymer), which is an advanced fluoropolymer with superior chemical resistance and mechanical properties. A variety of fluorinated polymers such PVDF and PTFE are also suitable.

In addition to using high purity materials, the high purity flow path should have a constant diameter and no intrusions or multiple flow paths—a dual tube sensor or a curved flow path should be avoided. This minimizes pressure drop, reduces the shear rate on the fluid to a minimum, which is critical in some industries and applications. It also prevents plugging with certain materials, such as slurries. In certain applications, it is desirable to make the device 100 as small as possible. Interconnections between elements must therefore be as short as possible. To facilitate this, the plastic tubing may be placed inside of a close fitting metal tube, which prevents the plastic tubing from kinking when bent to a tight radius.

Figure 5:
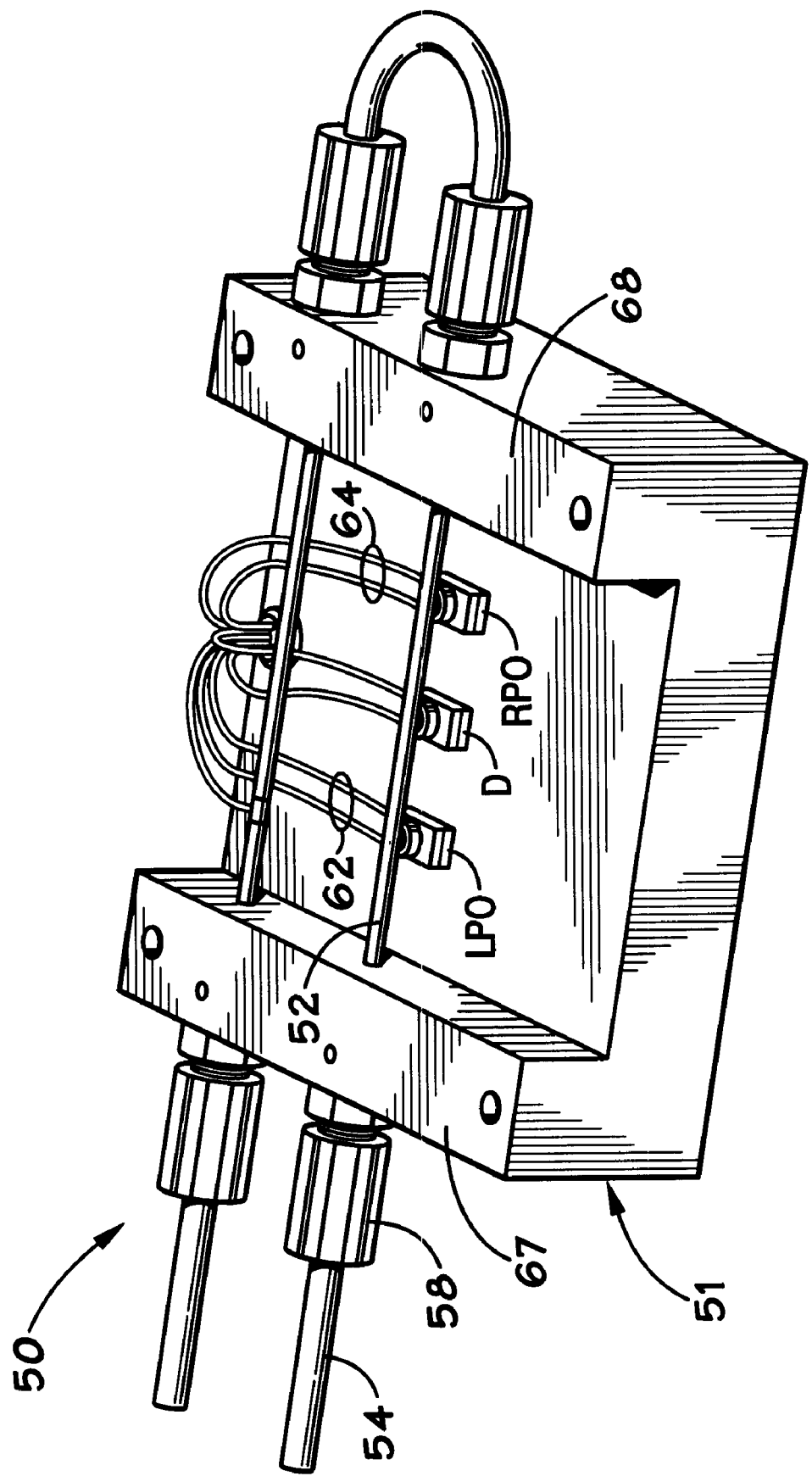
FIG. 5 is a perspective view of a high purity Coriolis mass flowmeter in accordance with aspects of the present invention.

An exemplary Coriolis mass flowmeter having a flowtube made of a high-purity plastic material is shown in FIG. 5. The Coriolis flowmeter 50 has a flow tube 52 inserted through legs 67, 68 of a base 51. The flow tube 52 is made of a high purity plastic material, preferably PFA. Pick offs LP0 and RP0 and a driver D are coupled to the flow tube 52. The flowmeter 50 receives a process material flow from a supply tube 54 and extends the flow through a connector 58 to the flow tube 52. The flow tube 52 is vibrated at its resonant frequency with material flow by the driver D. The resulting Coriolis motions are detected by pick offs LP0 and RP0 which apply signals over conductors 62 and 64 to meter electronics (not shown), which determines the phase difference between the Coriolis motions and applies output signals based thereon. Suitable Coriolis flowmeters having high purity flow tubes are disclosed in detail in the incorporated application entitled "Flowmeter for the Precision Measurement of an UltraPure Material Flow."

Figure 6:
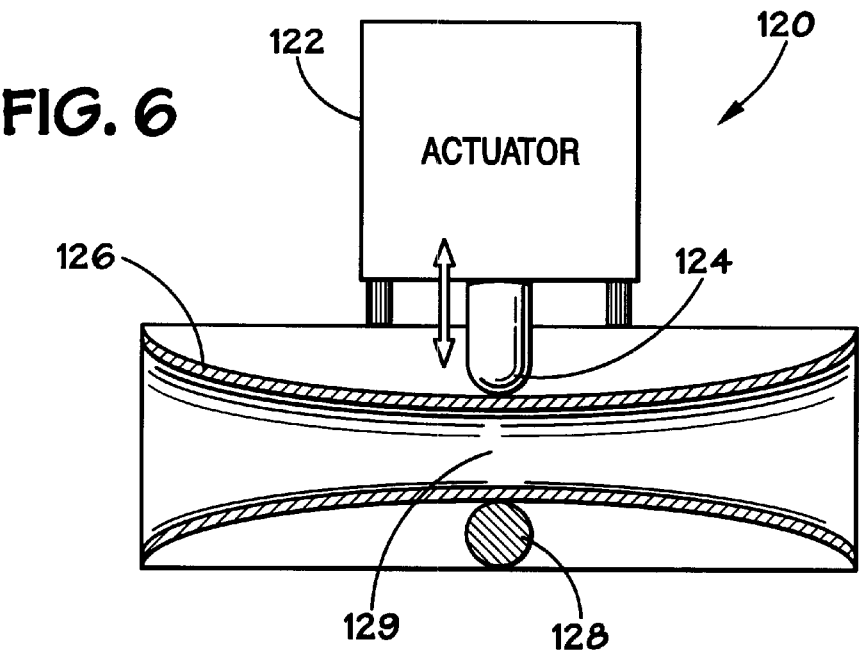
FIG. 6 schematically illustrates a high purity pinch valve in accordance with aspects of the present invention.

As with the Coriolis mass flowmeter 112, in high purity applications the pinch valve 110 must be made of materials that will minimize contamination of the fluid. Moreover, the valve 112 should be designed to have no places where stagnant fluid can collect and no sliding or rubbing parts that could create particles in the fluid. An exemplary pinch valve 120 in accordance with the present invention is conceptually illustrated in FIG. 6. An actuator 122 is situated next to an elastomeric tube 126, which is in fluid communication with the flow tube of the Coriolis mass flowmeter 112. A piston, or ram 124 is moved by the actuator 122 to selectively squeeze or pinch the tube 126 against a reference surface 128, thus varying the size of the opening through which fluid flows 129. The tube 126 is preferably made of a high purity elastomer or plastic. For example, PFA, a mixture including PFA materials, and silicone are suitable pinch tube materials.

The tube's flexibility allows the tubing walls to conform around any trapped particles or imperfections in the walls to provide a tight seal. The flow path is straight through, minimizing pressure drop and turbulence. The fluid contacts only the flow tube 126 preventing wear or corrosion of the other valve parts and preventing metal contamination of the slurry in the case of high purity applications, such as semiconductor polishing operations. In certain embodiments, the flow tube of the flowmeter 112 and the elastomeric tube of the pinch valve 110 are the same tube.

The actuation of known pinch valves is usually bi-stable—on and off. Some known pinch valves have a manual actuator with a multi-turn handle, but this type of valve would not be conducive to closed loop flow control. Other pinch valves are used for dispensing applications in batch processes, in which the amount of material dispensed is controlled by the time that the valve is on. This does not allow dynamically controlling the flow rate in a continuous manner.

A valve that has only two states can be controlled by applying varying current or voltage to the valve actuator. In one embodiment, pulse width modulation (PWM) is used to control the valve. PWM is achieved by generating a square wave signal at a frequency above the valve's mechanical response frequency. The duty cycle of the signal is varied to determine the appropriate voltage or current sent to the device. For example, if the PWM signal operates between 0–12 volts, 0% duty cycle=0 volts, 50% duty cycle=6 volts, and 100% duty cycle=12 volts. The "averaging" takes place because the signal is at a frequency above the valve's mechanical response frequency. The position of the valve is based on the average current that is supplied. The resulting supply voltage is proportional to the pulse width of the signal.

If the signal frequency is too low, the valve will have time to respond completely to on and off signals creating a pulsed flow output, which is generally not desirable. A typical pinch valve actuator is a solenoid, which has a spring element with a preload adjustment that determines the current required to close the solenoid. Adjusting the pre-load on the valve spring can improve the valve's control range. In other implementations, the solenoid plunger element is replaced with a spring-suspended plunger. The spring-suspended plunger minimizes the non-linear valve response due to friction, which minimizes the hysteresis and dead band common in available solenoid-actuated pinch valves.

An alternative approach to the PWM-controlled solenoid is to use a stepper motor actuator, which translates a controlled, deterministic angular rotation to a linear ram drive by a worm gear type arrangement. Stepper controllers can be designed to produce a specific number of steps proportional to an analog signal input. Backlash, and thus valve hysteresis can be minimized by any number of appropriate worm gear designs that minimize backlash. A stepper motor generally provides immunity to temperature and pressure fluctuations, which may cause changes in the pinch tubing. A stepper motor is a means to control position, so the stepper is immune changes in the pinch tubing. With a pinch valve, the pinch tube is an integral part of the system—current is applied to the valve actuator, which applies force to the pinch tube, which pinches the tube. If the tube properties change due to temperature or pressure, the amount the tube closes, and thus the flow rate with a solenoid, changes. Moreover, a stepper actuator can remain at the last position to provide fast response to achieving setpoint at the start of a fluid delivery cycle.

Figure 7:
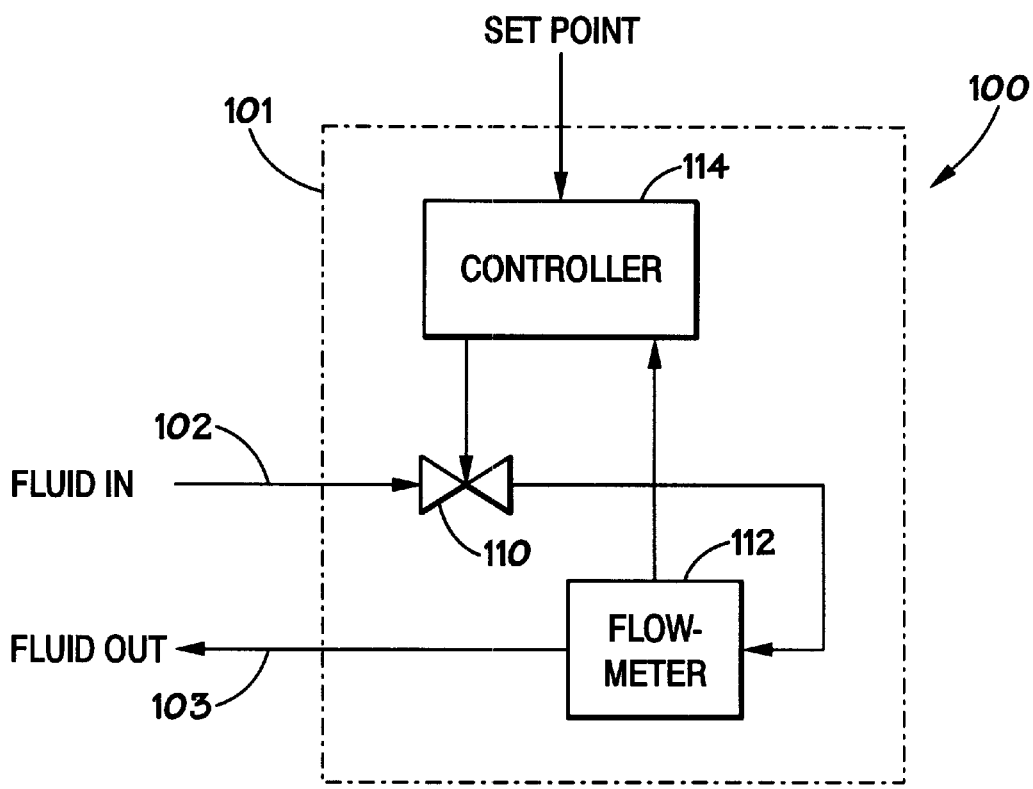
FIG. 7 is a block diagram illustrating a mass flow measurement and control device in accordance with an exemplary embodiment of the invention having fluid inlet and outlet connections on one side of the device.

The block diagram of FIG. 2, for example, shows the fluid inlet 102 on one side of the enclosure 101, with the outlet 103 on the opposite side of the enclosure. FIG. 7 shows an alternative embodiment with the inlet and outlet 102, 103 on the same end of the enclosure 101. Such an arrangement may be particularly desirable in applications where peristaltic pumps were previously used, since they typically have the inlet and outlet on the same end of the device.

Figure 8:
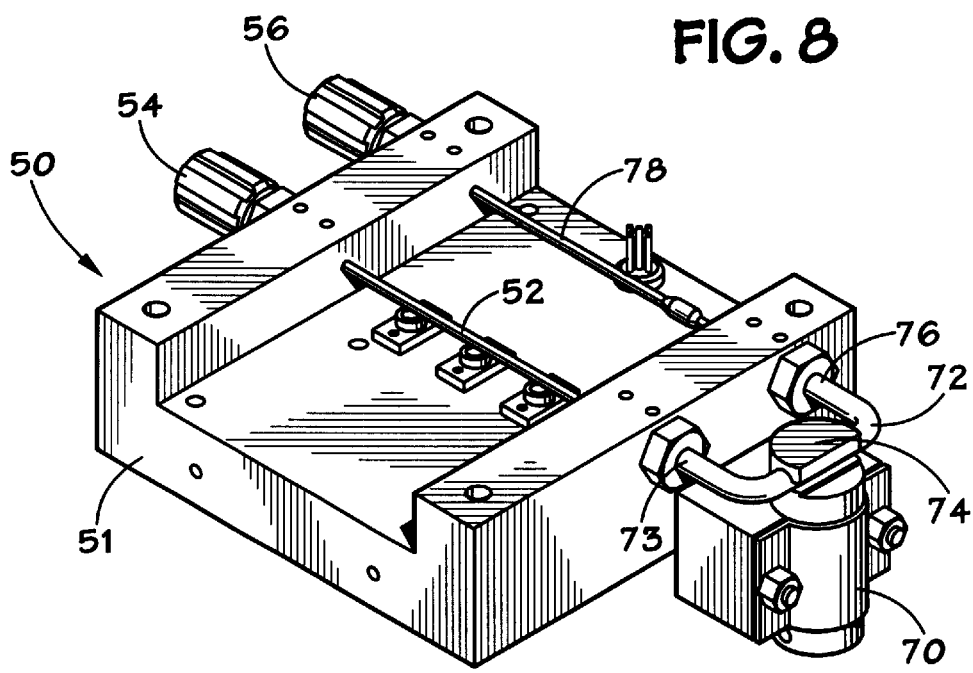
FIG. 8 is a perspective view of a Coriolis mass flowmeter and pinch valve assembly in accordance with aspects of the invention.

A Coriolis mass flowmeter and pinch valve in accordance with a particular embodiment of the invention are shown in FIG. 8. The Coriolis mass flowmeter 50 is essentially the same as illustrated in FIG. 5. The valve actuator 70 is attached to the base 51. The pinch valve elastomeric tube 72 includes an inlet end 73 connected to the flow tube 52. The opposite end of the flow tube 52 is connected to the fluid inlet 54. The tube 72 extends between a reference surface 74 and the ram or piston (not shown) of the actuator 70, and an outlet end 76 of the tube 72, which is connected to a return tube 78.

Figure 9A:
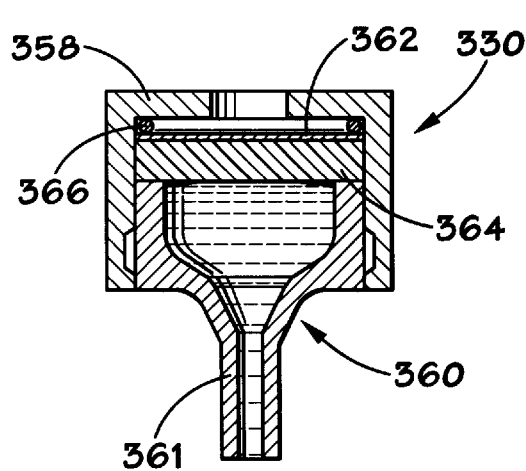
FIG. 9A schematically illustrates a high purity pressure transducer in accordance with the present invention.

As noted above, to achieve a high purity system the entire flow path must be made of a high purity, chemically inert/resistant material. FIG. 9A schematically illustrates a high purity pressure transmitter 330 with the wetted process connection including the pressure diaphragm constructed out of a single piece of high purity plastic. A key requirement of any instrumentation used in a high purity distribution system is that none of the devices can be a source of leaks. Threaded connections are avoided; the preferred method of making process connections is the use of a face to face seal. Fabricating the process connection 360 out of a single piece of plastic assures that there are no threaded connections, which can be a source of leaks.

The pressure transmitter 330 includes a sensor holder 358, which may be constructed of polypropylene since it is not part of the flow path. A pressure chamber 360 constructed of a high purity material such as PFA is nested in the sensor holder 358. The pressure chamber 360 defines a process fluid in-take guide 361 extending therefrom. To provide stable pressure measurement performance, a ceramic pressure sensor 362 is bonded to a high purity diaphragm 364 (for example, 1 mm thick PFA) and any relaxation of the plastic (also called creep) is compensated for by elastomer o-rings 366 situated on top of the ceramic sensor 362, which maintains the ceramic sensor against the plastic diaphragm 364 with a constant force. In this manner, the entire wetted part of the pressure transmitter 330 is PFA or another suitable high purity plastic material.

Figure 9B:
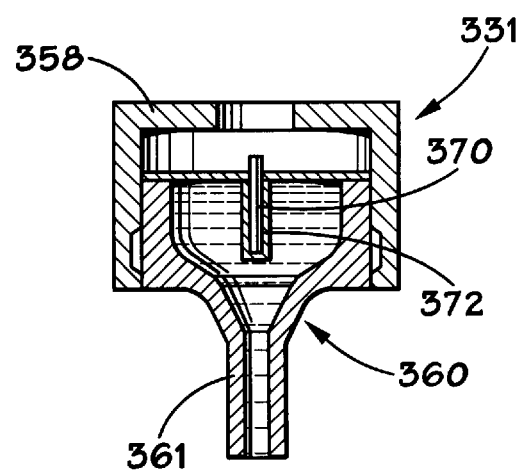
FIG. 9B illustrates an alternative embodiment of a high purity pressure transducer containing an encapsulated sapphire sensor.

An alternative pressure sensor 331 is shown in FIG. 9B. The pressure sensor 331 uses a small capacitance pressure sensor 370 constructed from sapphire. The sensor is encapsulated in a high purity material such as PFA 372 and extends into the pressure chamber 360 in such a way that the fluid pressure squeezes the sensor 370. An advantage of the approach shown in FIG. 9B is no fixed reference, such as a sturdy structure, is required for accurate pressure measurement. The encapsulated pressure sensor 370 is an integral part of the pressure chamber 360 and is constructed out of a single piece of high purity plastic.

Figure 13:
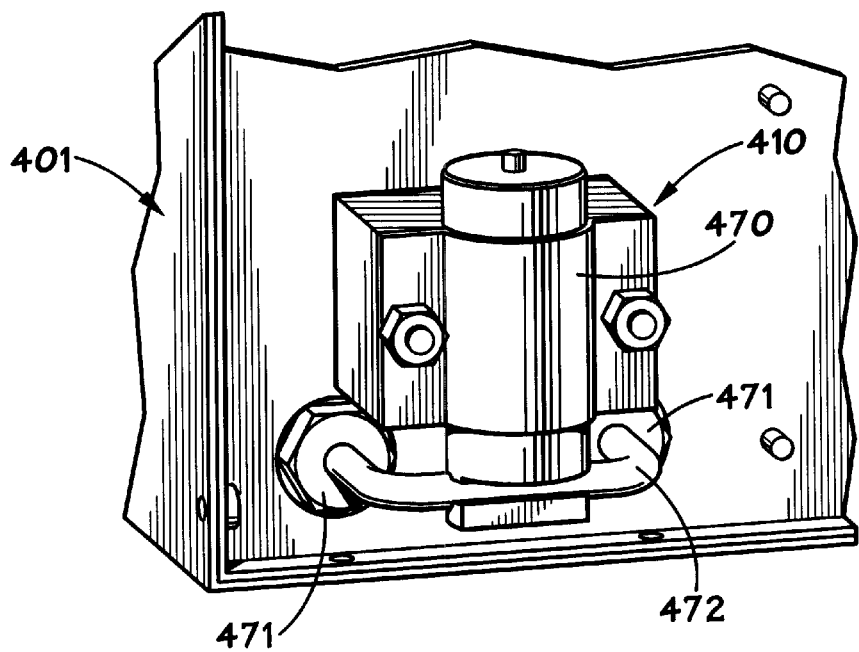
FIG. 13 is an enlarged view of the pinch valve assembly of the integrated Coriolis mass flow controller shown in FIGS. 10–12.
Figure 10:
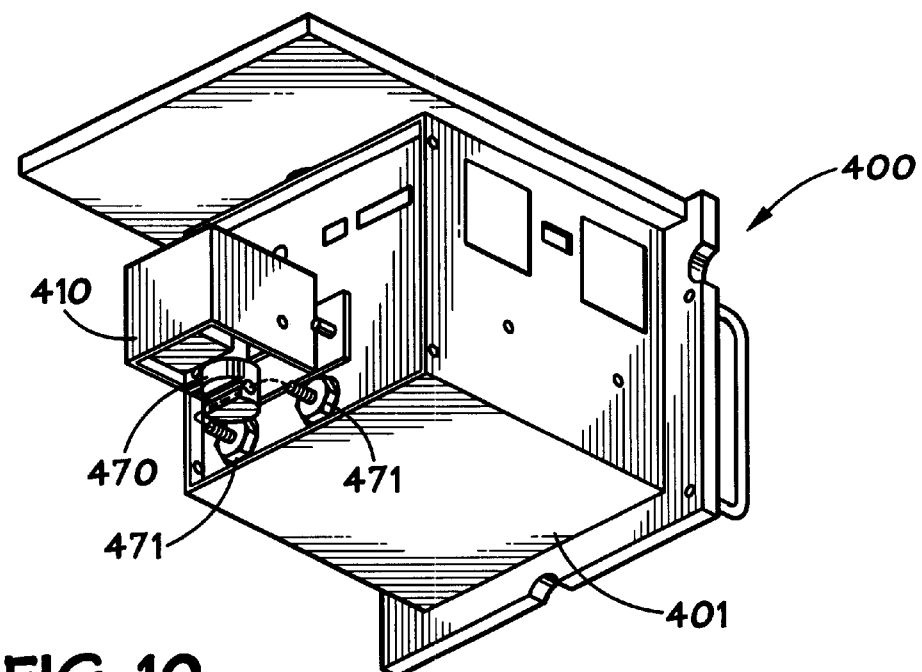
FIGS. 10 and 11 are rear and front perspective views, respectively, of an integrated Coriolis mass flow controller in accordance with an exemplary embodiment of the invention.
Figure 11:
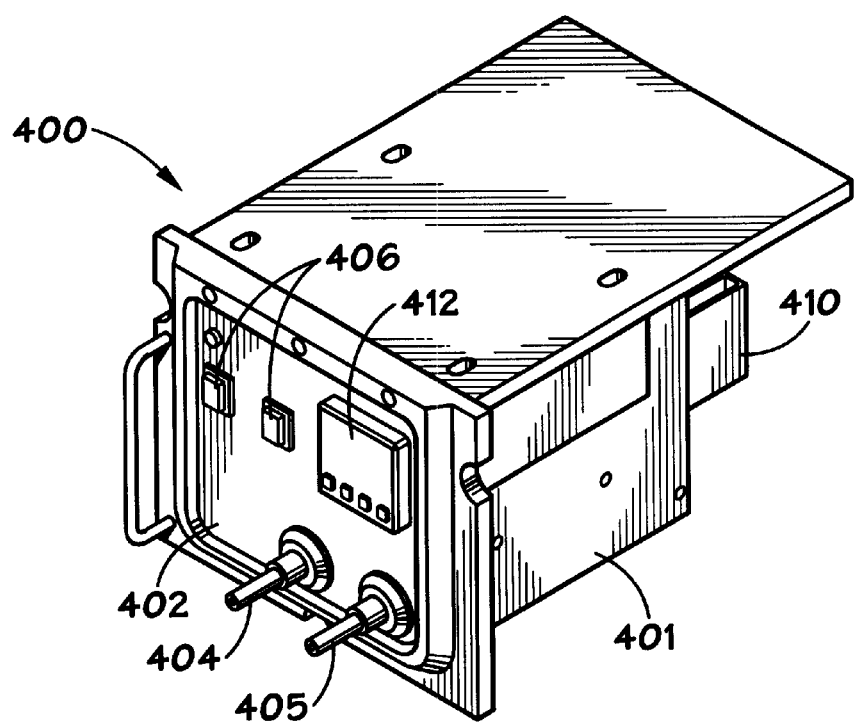
Figure 12:
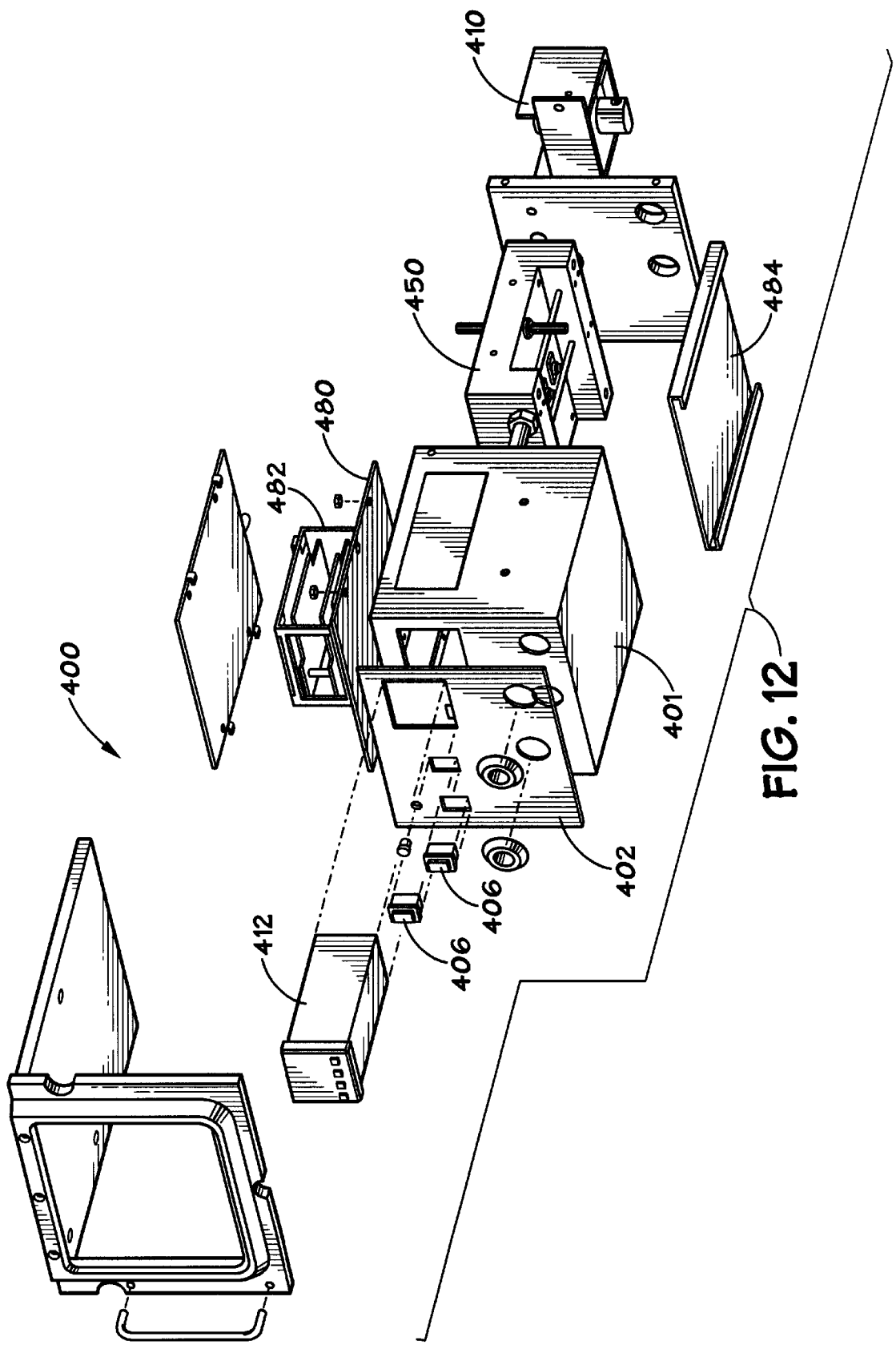
FIG. 12 is an exploded view of the integrated Coriolis mass flow controller shown in FIGS. 10 and 11.

FIGS. 10–12 illustrate various aspects of a high purity, integrated Coriolis mass flow controller 400. The integrated controller 400 includes an enclosure 401 with a faceplate 402 connected to a front end. Inlet and outlet connections 404, 405 extend from the faceplate 402, along with other user interface controls 406. Situated inside the enclosure 401 are a Coriolis mass flowmeter 450 and an electronic PID controller 412. A pinch valve assembly 410 is attached to the back end of the enclosure 401. For clarity, the pinch valve tube is not shown in FIG. 10. FIG. 13 shows the actuator 740 attached to the enclosure 401 with the pinch valve tube 472 extending from connectors 471, forming a generally U shape. The provision of the valve 410 on the outside of the enclosure 401 allows easy maintenance of the valve assembly 410, including replacement of the tube 472 as necessary. Other components of the controller 400 include an interface assembly 480, a thermal barrier 482, and a sensor spacer 484.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A mass flow measurement and control device, comprising:
    an enclosure;
    a Coriolis mass flowmeter situated in the enclosure, the Coriolis mass flowmeter including a flow-tube made of a high-purity plastic material, a driver coupled to the flow tube for vibrating the flow tube, and a pickoff coupled to the flow tube for sensing Coriolis deflections of the vibrating flow tube; and
    a pinch valve including an elastomeric tube made of a high-purity plastic material in fluid communication with the flow tube, an actuator having a ram operatively connected thereto situated adjacent the elastomeric tube, and a reference surface positioned generally opposite the ram such that the elastomeric tube is squeezable between the ram and the reference surface.

2. The mass flow measurement and control device of claim 1, further comprising a controller receiving a measurement output signal from the Coriolis flowmeter, the controller providing a control output signal to the pinch valve actuator in response to a setpoint signal and the Coriolis mass flowmeter output signal.

3. The mass flow measurement and control device of claim 2, wherein the controller is situated in the enclosure.

4. The mass flow measurement and control device of claim 1, wherein the high-purity plastic material comprises perfluoroalkoxy copolymer (PFA).

5. The mass flow measurement and control device of claim 1, wherein the pinch valve is situated in the enclosure.

6. The mass flow measurement and control device of claim 1, wherein the pinch valve elastomeric tube extends outside the enclosure.

7. The mass flow measurement and control device of claim 5, wherein the pinch valve actuator is attached to an outside surface of the enclosure.

8. The mass flow measurement and control device of claim 1, further comprising fluid inlet and outlet connections, the inlet and outlet connections being situated on one end of the enclosure.

9. The mass flow measurement and control device of claim 1, further comprising fluid inlet and outlet connections, the inlet and outlet connections being situated on opposite ends of the enclosure.

10. The mass flow measurement and control device of claim 1, wherein the pinch valve elastomeric tube is positioned downstream of the flow tube.

11. The mass flow measurement and control device of claim 1, wherein the pinch valve elastomeric tube is positioned upstream of the flow tube.

12. The mass flow measurement and control device of claim 1, wherein the actuator comprises a solenoid.

13. The mass flow measurement and control device of claim 12, wherein the solenoid is controlled with a pulse-width modulated signal.

14. The mass flow measurement and control device of claim 1, wherein the actuator comprises a stepper motor.

15. The mass flow measurement and control device of claim 2, wherein the controller comprises a proportional integral derivative (PID) controller.

16. The mass flow measurement and control device of claim 1, further comprising a pressure transducer in fluid communication with the flow tube.

17. The mass flow measurement and control device of claim 16, wherein the pressure transducer is situated upstream of the flow tube.

18. The mass flow measurement and control device of claim 16, wherein the pressure transducer is situated downstream of the flow tube.

19. The mass flow measurement and control device of claim 1, further comprising:
  a first pressure transducer in fluid communication with the flow tube situated upstream of the flow tube; and
  a second pressure transducer in fluid communication with the flow tube situated downstream of the flow tube.

20. A mass flow measurement and control device, comprising:
  an enclosure;
  a Coriolis mass flowmeter situated in the enclosure, the Coriolis mass flowmeter including a flow-tube made of a high-purity plastic material, a driver coupled to the flow tube for vibrating the flow tube, and a pickoff coupled to the flow tube for sensing Coriolis deflections of the vibrating flow tube; and
  a pinch valve including an actuator having a ram operatively connected thereto situated adjacent the flow tube, and a reference surface positioned generally opposite the ram such that the flow tube is squeezable between the ram and the reference surface.

21. The mass flow measurement and control device of claim 20, further comprising a controller receiving a measurement output signal from the Coriolis flowmeter, the controller providing a control output signal to the pinch valve actuator in response to a setpoint signal and the Coriolis mass flowmeter output signal.

22. The mass flow measurement and control device of claim 21, wherein the controller is situated in the enclosure.

23. The mass flow measurement and control device of claim 20, wherein the high-purity plastic material comprises PFA.

24. The mass flow measurement and control device of claim 20, wherein the actuator comprises a solenoid.

25. The mass flow measurement and control device of claim 20, wherein the actuator comprises a stepper motor.

26. A Coriolis measurement and control device for controlling a process material flow, comprising:
  an enclosure;
  first means for measuring mass flow without transferring ions to the process material, the first means being situated in the enclosure; and
  second means for varying fluid flow without transferring unwanted ions to the process material, the second means in fluid communication with the first means;
  third means for controlling the second means in response to the first means.

27. The mass flow measurement and control device of claim 26, wherein the third means is situated in the enclosure.

28. The mass flow measurement and control device of claim 26, wherein the second means includes an elastomeric tube through which the process material flows, the second means including means for squeezing the elastomeric tube.

29. The mass flow measurement and control device of claim 26, further comprising fourth means for measuring pressure in fluid communication with the first means.

* * * * *